US008689357B2

(12) United States Patent  
Arora et al.

(10) Patent No.: US 8,689,357 B2  
(45) Date of Patent: Apr. 1, 2014

(54) TAMPER DETECTOR FOR SECURE MODULE

(75) Inventors: Mohit Arora, Faridabad (IN); Rakesh Pandey, Indirapuram (IN); Pushkar Sareen, Nitya Nand Marg (IN); Prashant Bhargava, Gurgaon (IN)

(73) Assignee: Freescale Semiconductor, Inc., Austin, TX (US)

( * ) Notice: Subject to any disclaimer, the term of this patent is extended or adjusted under 35 U.S.C. 154(b) by 206 days.

(21) Appl. No.: 13/475,947

(22) Filed: May 19, 2012

(65) Prior Publication Data

US 2013/0312122 A1  Nov. 21, 2013

(51) Int. Cl.  
*G06F 21/00* (2013.01)

(52) U.S. Cl.  
USPC .......................................................... 726/34

(58) Field of Classification Search  
USPC .......................................................... 726/34  
See application file for complete search history.

(56) References Cited

U.S. PATENT DOCUMENTS

| | | | |
|---|---|---|---|
| 5,383,143 A | 1/1995 | Crouch et al. | |
| 5,446,864 A | 8/1995 | Burghardt | |
| 5,457,748 A | 10/1995 | Bergum | |
| 6,002,501 A | 12/1999 | Smith et al. | |
| 6,646,565 B1 | 11/2003 | Fu et al. | |
| 6,946,960 B2 | 9/2005 | Sisson et al. | |
| 7,953,989 B1 | 5/2011 | Hsiang | |
| 8,127,151 B2* | 2/2012 | Nelson et al. | ................. 713/193 |
| 2004/0236961 A1* | 11/2004 | Walmsley | ..................... 713/200 |
| 2004/0252053 A1* | 12/2004 | Harvey | .................... 342/357.15 |
| 2010/0192014 A1 | 7/2010 | Mejdrich | |

OTHER PUBLICATIONS

Xavier Charvet, Herve Pelletier, "Improving the DPA attack using Wavelet transform", downloaded from http://csrc.nist.gov/groups/STM/cmvp/documents/fips140-3/physec/physecdoc.html, undated (downloaded Mar. 5, 2012).

Maxim: "Secure supervisor IC has active tamper detection", EE Times, Feb. 5, 2009.

* cited by examiner

*Primary Examiner* — Tu Nguyen  
(74) *Attorney, Agent, or Firm* — Charles Bergere

(57) ABSTRACT

A tamper detector has input and output pins for connection to ends of a tamper detection circuit, and a corresponding set of linear feedback shift registers (LFSRs) timed by clock signals for generating pseudo-random coded detection signals as a function of seed values and of a generator polynomial defined by feedback taps. A comparator compares signals received from the detection circuit with the coded detection signals. A multiplexer provides the coded detection signal selectively from the LFSRs to the output pin and the comparator. A controller varies the seed values for different cycles of values of the pseudo-random coded detection signals. The controller also controls the generator polynomial and a frequency of the clock signals for different cycles of values of the pseudo-random coded detection signals.

19 Claims, 4 Drawing Sheets

PRIOR ART

| | MUX 0 | MUX 1 | MUX 2 | MUX 3 |
|---|---|---|---|---|
| LFSR 0 | 1 | 0 | 0 | 0 |
| LFSR 1 | 0 | 1 | 0 | 0 |
| LFSR 2 | 0 | 0 | 1 | 0 |
| LFSR 3 | 0 | 0 | 0 | 1 |
Fig. 5
| | MUX 0 | MUX 1 | MUX 2 | MUX 3 |
|---|---|---|---|---|
| LFSR 0 | 1 | 1 | 1 | 1 |
| LFSR 1 | 0 | 0 | 0 | 0 |
| LFSR 2 | 0 | 0 | 0 | 0 |
| LFSR 3 | 0 | 0 | 0 | 0 |
Fig. 6
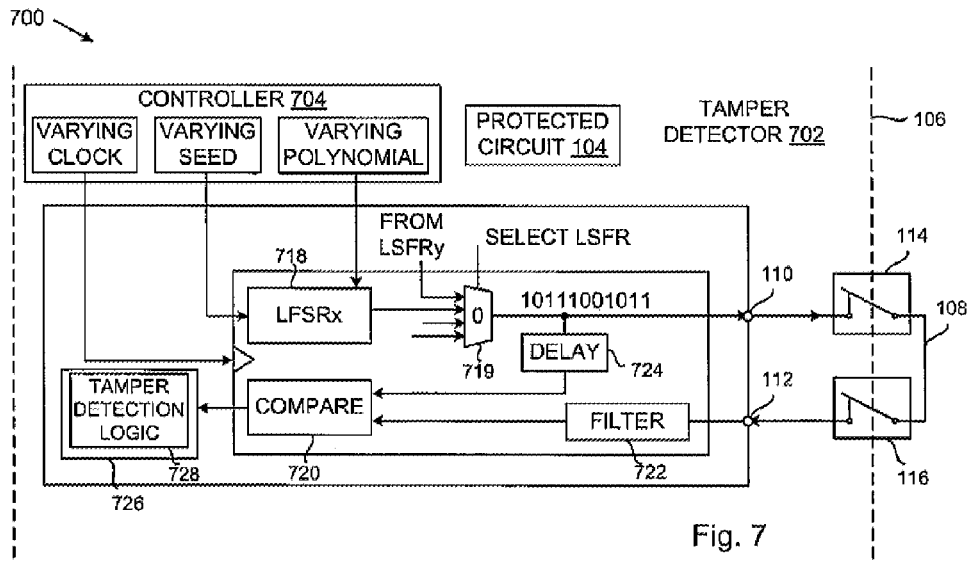
Fig. 7
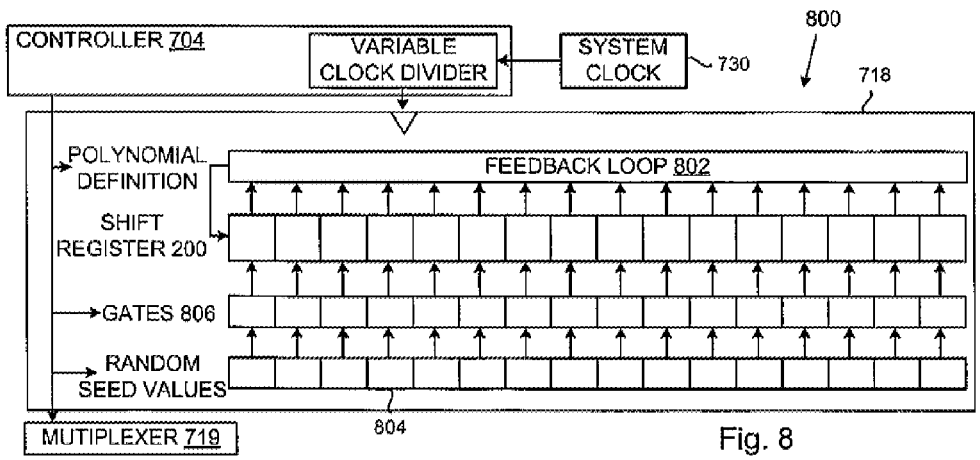
Fig. 8

US 8,689,357 B2

TAMPER DETECTOR FOR SECURE MODULE

BACKGROUND OF THE INVENTION

The present invention is directed to electronic circuits, and, more particularly, to a tamper detection circuit for a secure module.

Tampering with a module involves unauthorized access to the module, for example with the intention of retrieving, altering or adulterating sensitive information, a product, a package, or system. A protected object may be a secured electronic module such as a payment terminal or cash dispenser for use with bank cards, an authentication terminal for use with smart cards containing identity data and other personal information, or a cryptographic module, for example. A protected object may be in an electrically secured casing, room, safe or vault, for example. Security countermeasures against tampering involve physical features making unauthorized access more difficult, including a closure such as a door, cover, casing, encapsulation or a wrapping surrounding the module. Detection of tampering typically includes detection of attack on the secured physical features.

The security of the module may include a tamper detector for detecting interference with one or more detection circuits securing access to the module. The detection circuits may be electrical conductors whose continuity is interrupted by tampering, for example conductors bridging two components or formed in a wrapping forming part of the closure and that become an open-circuit if the wrapping is pierced. Alternatively, the electrical detection circuits may have switches designed to open or close if a closure is opened. The detection circuits may alternatively include optical detection circuits and transducers. An output of the tamper detector may apply to one end of a detection circuit of the physical security feature a detection signal which the detector compares with a signal from the other end of the detection circuit received at an input of the detector in order to detect interference with the detection circuit.

More sophisticated attacks may attempts to neutralize the tamper detection. For example, an attack may include injecting a foreign signal into the detector input to simulate the detection signal and camouflage interference with the detection circuit. To complicate such an attack, the detection signal may include a pseudo-random code, that is to say a deterministic code that cannot be predicted without knowing or discovering the algorithm used to generate the code and the initial seed. Typically a linear feedback shift register (LFSR) is used to generate such a pseudo-random code. Attempts to crack a pseudo-random code may include simple and differential power analysis (SPA and DPA), which derive cryptographic intermediate values visually or by statistical analysis of variations in power consumption by the computation of the pseudo-random code.

It is desirable to avoid complications introduced into the tamper detector by tamper countermeasures for guarding against an attack that make installation and programming of the tamper detector more difficult to make and use.

BRIEF DESCRIPTION OF THE DRAWINGS

The present invention is illustrated by way of example and is not limited by embodiments thereof shown in the accompanying figures, in which like references indicate similar elements. Elements in the figures are illustrated for simplicity and clarity and have not necessarily been drawn to scale.

FIGS. 5 and 6 are look-up tables of the tamper detector of FIGS. 3 and 4 respectively;

FIG. 7 is a schematic block diagram of a tamper detector element in accordance with an embodiment of the invention, given by way of example; and FIG. 8 is a schematic block diagram of a controller of the tamper detector element of FIG. 7.

DETAILED DESCRIPTION OF THE INVENTION

Figure 1:
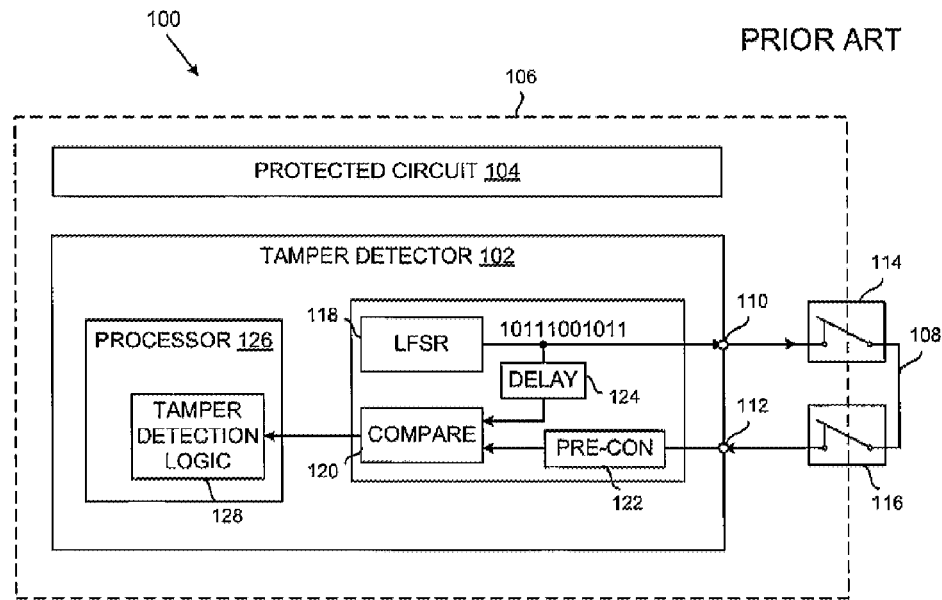
FIG. 1 is a schematic block diagram of a conventional secure module having a tamper detector.
Figure 2:
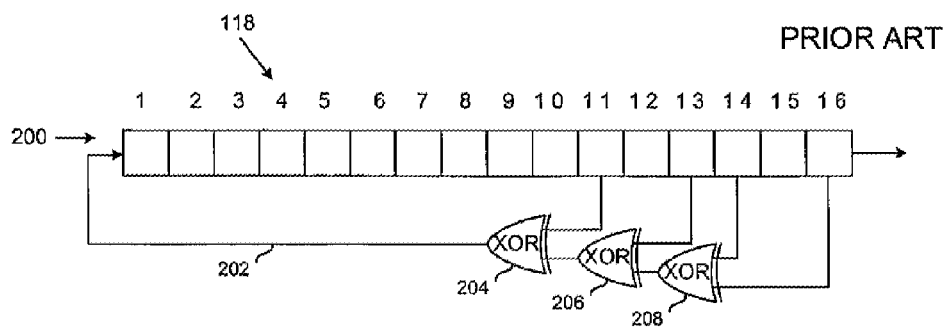
FIG. 2 is a schematic diagram of a conventional linear feedback shift register.

FIGS. 1 and 2 illustrate a conventional secure module 100 having a tamper detector 102 and a circuit 104 that is protected against unauthorized access. The physical protection of the circuit 104 includes a physical closure 106 surrounding the protected circuit 104 and a detection circuit 108 linked with the physical closure 106. One end of the detection circuit 108 is connected to an output pin 110 of the tamper detector 102 and the other end of the detection circuit 108 is connected to an input pin 112 of the tamper detector 102. The detection circuit 108 is shown including detection switches 114 and 116 in series, which are normally closed but are opened in case of interference with the physical closure 106, but often it is sufficient for the detection circuit 108 to include electrical conductors whose continuity is interrupted by such interference. The detection switches 114 and 116 are themselves protected from access by the physical closure 106, for example by being embedded in the material of the closure. Although a single detection circuit 108 is shown for simplicity, in practice the securitized module 100 will typically include more than one detection circuit 108 connected to respective pairs of output pins 110 and input pins 112 of the tamper detector 102.

The tamper detector 102 includes a linear feedback shift register (LFSR) 118 for generating pseudo-random coded detection signals that are applied to the output pin 110. A comparator 120 in the tamper detector 102 has an input connected to the input pin 112 through a signal pre-conditioner 122. The signal pre-conditioner 122 has a digital filter that blocks the incoming signal until it is stable for a programmed number of clock cycles for filtering glitches in the detection signal. Another input of the comparator 120 receives the detection signals from the LFSR 118 through a delay circuit 124, which delays the detection signals, in this case by one cycle of the internal clock signals to synchronize them with the signals received from the detection circuit 108 by way of the signal pre-conditioner 122. The comparator 120 compares the detection signals with the signals received from the detection circuit 108 and asserts a tamper signal if a significant difference is detected. A processor 126 in the tamper detector 102 includes a tamper detection logic circuit 128 and when the comparator 120 asserts the tamper signal the processor 126 takes suitable protective action, such as stopping the production of detection signals to prevent an attacker camouflaging his attack by connecting the output pin 110 to the input pin 112, and effacing sensitive data such as codes or private keys before the attacker has gained access to them.

FIG. 2 illustrates a conventional example of a Fibonacci LFSR 118 that includes a shift register 200 having a set of sixteen series connected flip-flops (numbered 1 to 16 in the drawing) with the input of each flip-flop (except the first flip-flop) being connected to the output of the preceding flip-flop. The state of each flip-flop except the first changes to a value defined by the output of the preceding flip-flop in response to clock signals. The input of the first flip-flop 1 is connected to a linear feedback loop 202, the feedback signal being a linear function of signals from taps at outputs of flip-flops of the shift register, including the last flip-flop. The feedback tap signals are selected and combined linearly by a generator polynomial defined by exclusive OR (XOR) gates 204, 206 and 208, either hard wired as illustrated or provided by software. The generator polynomial is chosen by the producer of the protected module. The output signals from the output of the last flip-flop 16 of the shift register 200 are deterministic, that is to say that each state of the shift register is determined by its previous state and by the seed, the initial value of the LFSR. The shift register 200 has a finite number of possible states before repeating a cycle of successive states. The positions of the four taps shown at the outputs of flip-flops 11, 13, 14 and 16 give a maximum-length sequence of outputs, in this example 65,535, before repeating itself.

Figure 3:
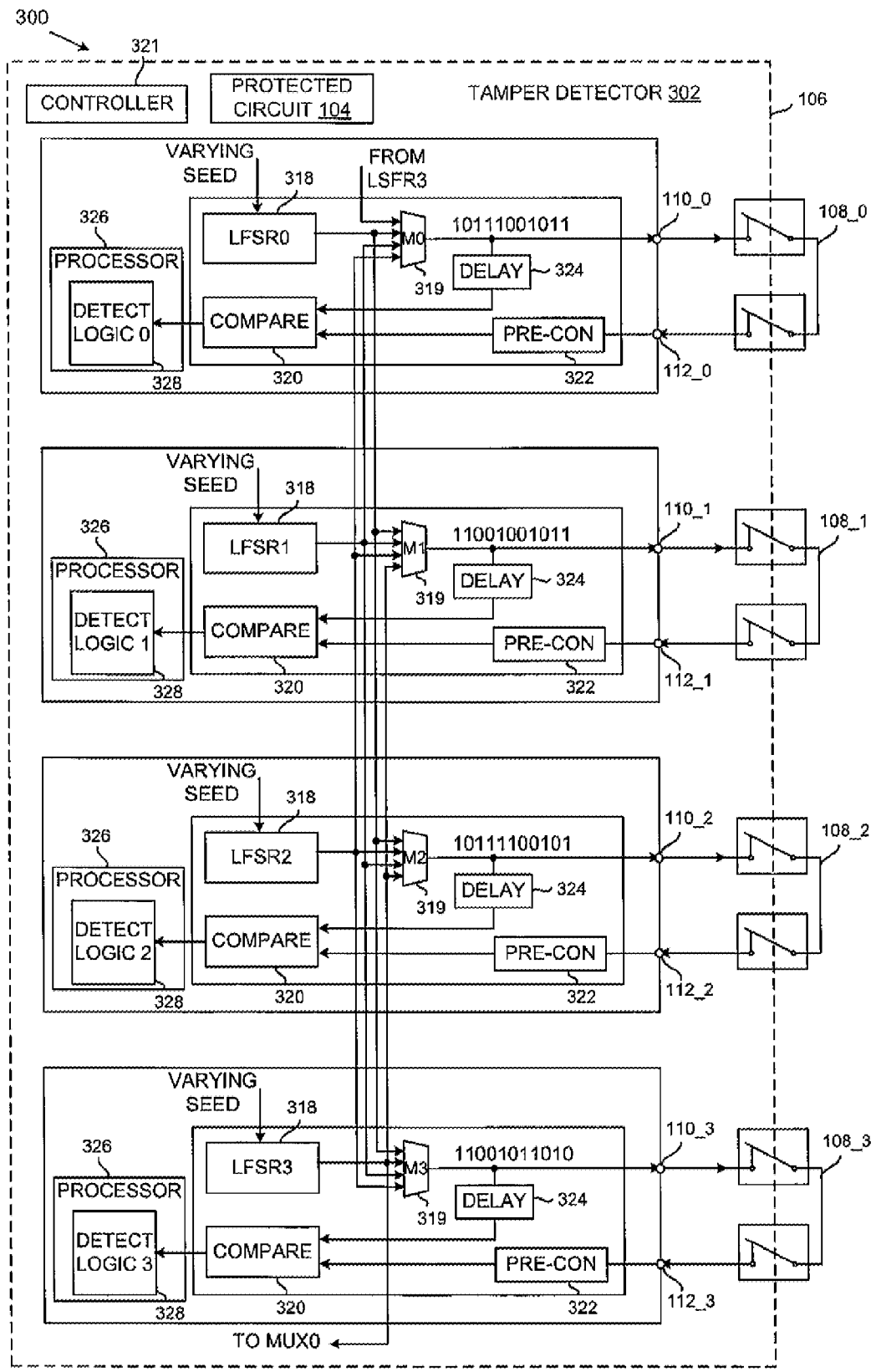
FIG. 3 is a schematic block diagram of a tamper detector in accordance with an embodiment of the invention, given by way of example, in a first configuration.
Figure 4:
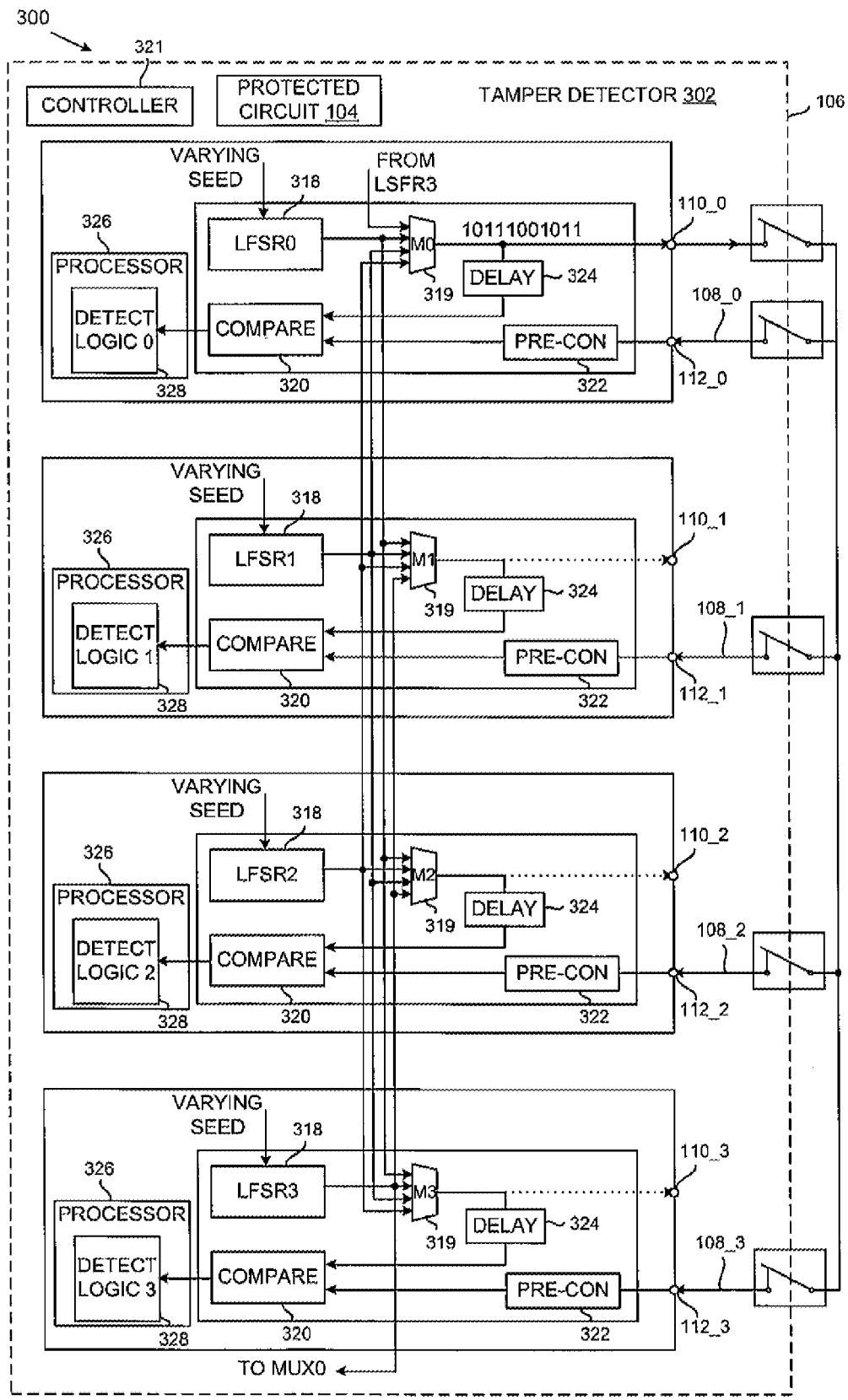
FIG. 4 is a schematic block diagram of the tamper detector of FIG. 3 in a second configuration.

FIGS. 3 and 4 illustrate an example of a secure module 300 having a tamper detector 302 in accordance with an embodiment of the present invention, given by way of example, in two different configurations. The secure module 300 includes the circuit 104 that is protected against unauthorized access. The physical protection of the circuit 104 includes a physical closure 106 surrounding the protected circuit 104 and a set of detection circuits 108_0 to 108_3 intimately linked with the physical closure 106 and preventing unauthorized access to the module 300. A processor 326 in the tamper detector 302 includes a tamper detection logic circuit 328 and when a comparator 320 asserts a tamper signal, the processor 326 takes protective action. The configuration of the detection circuits 108_0 to 108_3 may be selected by the producer of the securitized module 300 as a function of different requirements, and the producer can then readily adapt a standardized tamper detector 302 to the chosen configuration.

The tamper detector 302 has a set of output pins 110_0 to 110_3 and a set of input pins 112_0 to 112_3 for connection to ends of the detection circuits 108_0 to 108_3 respectively. The tamper detector 302 also has a set of LFSRs 318 corresponding to the sets of input and output pins 112, 110. The LFSRs 318 have feedback taps for generating pseudo-random coded detection signals as a function of seed values and of a generator polynomial defined by the feedback taps. A corresponding set of comparators 320 compare signals received from the detection circuits 108_0 to 108_3 by way of the input pins 112_0 to 112_3 and a preconditioning circuit 322 with the coded detection signals delayed in a delay circuit 324. A corresponding set of multiplexers 319 apply the coded detection signals to the output pins 110_0 to 110_3 and to the comparators 320. A controller 321 controls the multiplexers 319 to apply the coded detection signals selectively from one or more of the LFSRs 318 to the output pins 110_0 to 110_3 and to the comparators 320.

FIGS. 3 and 4 illustrate an example of the tamper detector 302 having four pairs of sets of output pins 110_0 to 110_3 and input pins 112_0 to 112_3, but it will be appreciated that other numbers of pairs of input and output pins may be provided. The configuration of the detection circuits 108_0 to 108_3 may readily be selected by the manufacturer of the secure module 300 as a function of his requirements, by programming the multiplexers 319 of the tamper detector 302 as a function of the disposition of the detection circuits 108_0 to 108_3. In the example shown in FIG. 3, each of the detection circuits 108_0 to 108_3 is connected independently of the others to corresponding pairs of the output and input pins 110_0 to 110_3 and 112_0 to 112_3 and to corresponding independent LFSRs 318. In the example shown in FIG. 4, the first output pin 110_0 and the output of the corresponding first LFSR 318 LSFR0 are connected to all the detection circuits 108_0 to 108_3, which are then connected separately to corresponding input pins 112_0 to 112_3 and to the separate comparators 320, which use the same detection signal to supervise the different detection circuits 108_0 to 108_3. The inactive LFSRs 318 LSFR1 to LSFR3 may be disabled and the corresponding output pins 110_1 to 110_3 may be used for passive tamper detection, for example by connecting a constant voltage source to any of the input pins 112_1 to 112_3, and monitoring the received voltage.

The detection circuits 108_0 to 108_3 can be designed as a function of a chosen configuration with one end of each of the detection circuits 108 connected to the appropriate output pin 110 of the tamper detector 102 and the other end of the detection circuit 108 connected to the appropriate input pin 112 of the tamper detector 102. The controller 321 can then be programmed to control the multiplexers 319 using a look-up table (LUT) 500. FIGS. 5 and 6 illustrate the values in the LUT 500 corresponding to the configurations of the tamper detector 302 shown in FIGS. 3 and 4 respectively. The row values of the LUT 500 define the interconnections between respective LFSRs 318 and the outputs of the multiplexers 319 identified in respective columns. A value shown in the drawing as '1' corresponds to assertion of an interconnection between the LFSR 318 in the same row and the output of the multiplexer 319 in the same column. A value shown in the drawing as '0' corresponds to de-assertion of that interconnection. In FIG. 5, the values '1' are programmed for interconnection of the LFSRs 318 LFSR0, LFSR1, LFSR2 and LFSR3 to the outputs of the multiplexers 319 MUX0, MUX1, MUX2 and MUX3 respectively, as shown physically in FIG. 3. In FIG. 6, the values '1' are programmed for interconnection of the LFSR 318 LFSR0 to the outputs of all the multiplexers MUX0, MUX1, MUX2 and MUX3, as shown physically in FIG. 4.

FIG. 7 illustrates an example of a secure module 700 having a tamper detector 702 and a circuit 104 that is protected against unauthorized access. The physical protection of the circuit 104 includes a physical closure 106 surrounding the protected circuit 104 and a detection circuit 108 intimately linked with the physical closure 106 and securing access to the module 700. The tamper detector 702 has an output pin 110 and an input pin 112 for connection to respective ends of the detection circuit 108. The tamper detector 702 also has an LFSR 718 having feedback taps for generating pseudo-random coded detection signals as a function of seed values and of a generator polynomial defined by the feedback taps. The coded detection signals are applied to the output pin 110. A comparator 720 compares signals received from the detection circuit 108 by way of the input pin 112 and by way of a preconditioning circuit 722 with the coded detection signals that have been delayed with a delay circuit 724. A processor 726 includes a tamper detection logic circuit 728. When the comparator 720 asserts a tamper signal, the processor 726 takes suitable protective action. The module 700 may have a single LFSR 718, output pin 110 and input pin 112 and detection circuit 108, but in this example, like the module 300, the module 700 has a set of detection circuits 108 with corresponding sets of tamper detection elements having multiplexers 719 for programming the interconnections with the detection circuits, one set only being shown in FIG. 7 for simplicity.

In accordance with an embodiment of the invention, given by way of example, the tamper detector 702 also has a controller 704 for controlling and varying the seed values for different cycles of values of the pseudo-random coded detection signals. If the seed values were constant, an n-stage LFSR would repeat its state sequence after a cycle of $2^n-1$ consecutive states; that is, for the example of a 16-stage LFSR 118 after a cycle of 65,535 states. The controller 704 varies the seed values so that each seed value is uncorrelated with previous seed values. Varying the seed values for different cycles of values of the pseudo-random coded detection signals makes it more difficult for an attacker to deduce and predict the seed values and hence the subsequent values of the coded detection signal. In this example, the controller 704 varies the seed values before the pseudo-random coded detection signals start to repeat a cycle of values so that the values do not present repetitive deterministic cycles of values for an attacker to analyze.

In accordance with another embodiment of the invention, given by way of example, the LFSR 718 is timed by clock signals and the controller 704 controls and varies at least two of the seed values, the generator polynomial and a frequency of the clock signal for different cycles of values of the pseudo-random coded detection signals. Varying two or more of these parameters makes it more difficult for an attacker to deduce and predict the subsequent values of the detection signal.

In one example having sets of the output pins 110, input pins 112, LFSRs 718 and comparators 720, the controller 704 provides different seed values for different LFSRs 718.

In this example, the controller 704 varies the seed values, the generator polynomial and/or the frequency of the clock signals before the pseudo-random coded detection signals start to repeat a cycle of values. For example, the controller 704 varies the seed values, the generator polynomial and/or the frequency of the clock signals at intervals that are a function of a random or pseudo-random signal. In an example, the seed values are a function of a combination of on-chip random access memory (RAM) address signals and variables related to the generator polynomial. In order to ensure that the seed values are never all zeros, the combination may include a non-zero constant input value. The combination may be a linear combination, such as an XOR function of the different input values, so that the new seed value is given by the following equation:

(constant) XOR (RAM address) XOR (generator polynomial) where the values are 16-bit vectors for a 16-bit LFSR, RAM address being a 15-bit on-chip RAM address plus a 1-bit on-chip RAM chip select value for a memory area of a central system, unrelated to the tamper detector, for example.

In more detail, in an example of an element 800 of the tamper detector 702 shown in FIG. 8, the LFSR 718 includes a shift register 200, a configurable feedback loop 802, a register 804 for storing the seed values defined by the controller 704 and a set of gates 806 for selectively applying the seed values from the register 804 as a parallel input to the shift register 200. As well as applying signals to control the multiplexers 719, the controller 704 generates a signal controlling the configuration of the feedback loop 802 defining the polynomial generator, a seed input signal to the register 804 that may be a serial input, and a trigger signal controlling the moment when the gates 806 apply the seed values from the register 804 to the shift register 200.

The controller 704 also includes a variable clock frequency divider 808 for the tamper detector element 800, which divides the clock frequency of a system clock signal from a generator 730 by a variable ratio defined by the controller 704. In this example, the resulting clock frequency is always greater than one Hertz, for example two Hertz or more so that an attacker does not have enough time to de-cipher the algorithm corresponding to the LFSRs and recreate simulations of the LFSRs outputs. In one example, the resulting clock frequency is of the order of hundreds of Hertz. The clock frequency or frequencies for the LFSR may be selected as a function of security requirements and power consumption, for example. The pre-conditioning filter is programmed so that the cut-off frequency of its low pass filter is higher than the clock frequency for the LFSR to avoid distorting the received signal and corrupting comparison with the coded detection signal.

The invention may at least partially be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, a plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

The terms "assert" or "set" and "negate" (or "de-assert" or "clear") are used herein when referring to the rendering of a signal, status bit, or similar apparatus into its logically true or logically false state, respectively. If the logically true state is a logic level one, the logically false state is a logic level zero. Also, if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. Similarly, any arrangement of components to achieve the same functionality is effectively "associated" such that the desired functionality is achieved. Hence, any two components combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Multiple operations described above may be combined into a single operation, a single operation may be distributed in additional operations, and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

In the claims, the word 'comprising' or 'having' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

The invention claimed is:

1. A tamper detector for detecting interference with a detection circuit, the tamper detector comprising:
   an input pin and an output pin for connection to respective ends of said detection circuit;
   a linear feedback shift register (LFSR) timed by clock signals and having feedback taps for generating pseudo-random coded detection signals as a function of seed values and of a generator polynomial defined by said feedback taps, said coded detection signals being applied to said output pin;
   a comparator for comparing signals received from said detection circuit by way of said input pin with said coded detection signals; and
   a controller for controlling and varying at least two of said seed values, said generator polynomial and a frequency of said clock signals.

2. The tamper detector of claim 1, wherein the tamper detector has sets of said output pins, input pins, LFSRs and comparators and wherein said controller provides different seed values for different LFSRs.

3. The tamper detector of claim 1, wherein said controller varies said at least two of said seed values, said generator polynomial and a frequency of said clock signals before said coded detection signals start to repeat a cycle of values.

4. The tamper detector of claim 1, wherein said controller varies said at least two of said seed values, said generator polynomial and a frequency of said clock signals at intervals that are a function of a random or pseudo-random signal.

5. The tamper detector of claim 1, wherein said seed values are a function of a combination of on-chip random access memory address signals and variables related to said generator polynomial.

6. The tamper detector of claim 5, wherein the combination includes a non-zero constant input value.

7. A tamper detector for detecting interference with detection circuits that secure access to a module, the tamper detector comprising:
   a set of input pins and a set of output pins for connection to ends of said detection circuits respectively;
   a set of linear feedback shift registers (LFSR) having feedback taps for generating pseudo-random coded detection signals as a function of seed values and of a generator polynomial defined by said feedback taps;
   a set of comparators for comparing signals received from said detection circuits by way of said input pins with said coded detection signals;
   a set of multiplexers for providing said coded detection signals to said output pins and to said comparators; and
   a controller for controlling said multiplexers to provide said coded detection signals selectively from one or more of said LFSRs to said output pins and to said comparators.

8. The tamper detector of claim 7, wherein said controller includes a programmable look-up table for defining selective interconnections of said LSFRs to said output pins and to said comparators by said multiplexers.

9. The tamper detector of claim 7, wherein said LFSR is timed by clock signals and said controller controls and varies at least two of said seed values, said generator polynomial, and a frequency of said clock signal for different cycles of values of said coded detection signals.

10. The tamper detector of claim 9, wherein said controller varies said at least two of said seed values, said generator polynomial and a frequency of said clock signals before said coded detection signals start to repeat a cycle of values.

11. The tamper detector of claim 9, wherein said controller varies said at least two of said seed values, said generator polynomial, and a frequency of said clock signals at intervals that are a function of a random or pseudo-random signal.

12. The tamper detector of claim 7, wherein said seed values are a function of a combination of on-chip random access memory address signals and variables related to said generator polynomial.

13. The tamper detector of claim 12, wherein the combination includes a non-zero constant input value.

14. A tamper detector for detecting interference with a detection circuit that secures access to a module, the tamper detector comprising:
   an input pin and an output pin for connection to respective ends of said detection circuit;
   a linear feedback shift register (LFSR) having feedback taps for generating pseudo-random coded detection signals as a function of seed values and of a generator polynomial defined by said feedback taps, said coded detection signals being applied to said output pin;
   a comparator for comparing signals received from said detection circuit by way of said input pin with said coded detection signals; and
   a controller for controlling and varying said seed values for different cycles of values of said coded detection signals.

15. The tamper detector of claim 14, wherein the tamper detector has sets of said output pins, input pins, LFSRs and comparators and said controller provides different seed values for different LFSRs.

16. The tamper detector of claim 14, wherein said seed values are a function of a combination of on-chip random access memory address signals and variables related to said generator polynomial.

17. The tamper detector of claim 16, wherein the combination includes a non-zero constant input value.

18. The tamper detector of claim 14, wherein said controller varies said seed values before said coded detection signals start to repeat a cycle of values.

19. The tamper detector of claim 14, wherein said controller varies said seed values at intervals that are a function of a random or pseudo-random signal.

* * * * *